(12) United States Patent
Luo et al.

(10) Patent No.: US 12,374,053 B2
(45) Date of Patent: Jul. 29, 2025

(54) APPARATUS FOR DISPLAYING AUGMENTED REALITY IMAGE, AND SYSTEM COMPRISING APPARATUS

(71) Applicant: SVG TECH GROUP CO., LTD., Suzhou (CN)

(72) Inventors: Minghui Luo, Suzhou (CN); Wen Qiao, Suzhou (CN); Tangdong Cheng, Suzhou (CN); Ruibin Li, Suzhou (CN); Ling Li, Suzhou (CN); Ping Zhu, Suzhou (CN); Linsen Chen, Suzhou (CN)

(73) Assignee: SVG TECH GROUP CO., LTD., Suzhou (CN)

(*) Notice: Subject to any disclaimer, the term of this patent is extended or adjusted under 35 U.S.C. 154(b) by 0 days.

(21) Appl. No.: 17/801,379

(22) PCT Filed: Nov. 3, 2020

(86) PCT No.: PCT/CN2020/126117
§ 371 (c)(1),
(2) Date: Aug. 22, 2022

(87) PCT Pub. No.: WO2021/169383
PCT Pub. Date: Sep. 2, 2021

(65) Prior Publication Data
US 2023/0101961 A1    Mar. 30, 2023

(30) Foreign Application Priority Data
Feb. 28, 2020 (CN) .......................... 202010128082.3

(51) Int. Cl.
*G02B 5/18* (2006.01)
*G02B 6/12* (2006.01)
*G06T 19/00* (2011.01)

(52) U.S. Cl.
CPC .......... *G06T 19/006* (2013.01); *G02B 5/1814* (2013.01); *G02B 6/12009* (2013.01)

(58) Field of Classification Search
CPC .......................... G02B 5/1814; G02B 6/12009
See application file for complete search history.

(56) References Cited

U.S. PATENT DOCUMENTS

| 10,295,723 B1 | 5/2019 | Lee et al. |
| 2008/0137178 A1* | 6/2008 | Chung ..................... G02F 1/025 359/321 |

(Continued)

FOREIGN PATENT DOCUMENTS

| CN | 206161958 U | 5/2017 |
| CN | 10684239 | 6/2017 |

(Continued)

*Primary Examiner* — Yi Yang
(74) *Attorney, Agent, or Firm* — The Ollila Law Group LLC (57) ABSTRACT

The invention relates to image display technology, in particular to a device for rendering an augmented reality image and a system for realizing augmented reality display comprising the device. The device according to one aspect of the invention comprises: an optical waveguide lens; and a first two-dimensional grating array located on a surface of the optical waveguide lens; a second two-dimensional grating array located on the surface of the optical waveguide lens, wherein, positions of the first two-dimensional grating array and the second two-dimensional grating array on the surface of the optical waveguide lens are set so that larger edges of the two are opposite, wherein, the first two-dimensional grating array is configured such that rays incident on the first two-dimensional grating array expands to the entire first two-dimensional grating array on the one hand, and propagates to the second two-dimensional grating array on the other hand, wherein, the second two-dimensional grating array is configured such that rays propagating to the second (Continued)

two-dimensional grating array expands to the entire second two-dimensional grating array on the one hand, and emits from the optical waveguide lens on the other hand, wherein, the first two-dimensional grating array and the second two-dimensional grating array have the same period.

16 Claims, 10 Drawing Sheets

(56) References Cited

U.S. PATENT DOCUMENTS

| | | | |
|---|---|---|---|
| 2010/0321781 A1 | 12/2010 | Levola et al. | |
| 2014/0334604 A1* | 11/2014 | Teshima | G21K 1/025 378/154 |
| 2016/0033257 A1* | 2/2016 | Meissner | G01B 9/02015 356/498 |
| 2016/0231257 A1 | 8/2016 | Kostamo et al. | |
| 2017/0113481 A1* | 4/2017 | Hersch | G02B 30/27 |
| 2017/0315346 A1 | 11/2017 | Tervo et al. | |
| 2018/0172995 A1 | 6/2018 | Lee et al. | |
| 2019/0339436 A1* | 11/2019 | Lee | G02B 5/1823 |
| 2019/0384141 A1* | 12/2019 | Engelen | G01B 11/2536 |
| 2020/0018828 A1 | 1/2020 | Lyu | |
| 2020/0192088 A1* | 6/2020 | Yu | G02B 27/283 |
| 2020/0264367 A1* | 8/2020 | Huang | G02B 6/00 |

FOREIGN PATENT DOCUMENTS

| | | |
|---|---|---|
| CN | 109239920 | 1/2019 |
| CN | 109407313 A | 3/2019 |
| CN | 109459813 A | 3/2019 |
| CN | 10986344 | 6/2019 |
| CN | 110244463 A | 9/2019 |
| CN | 110727116 A | 1/2020 |
| JP | 2018506068 A | 3/2018 |
| JP | 2019534468 A | 11/2019 |
| WO | 2019122529 A1 | 6/2019 |

* cited by examiner

APPARATUS FOR DISPLAYING AUGMENTED REALITY IMAGE, AND SYSTEM COMPRISING APPARATUS

TECHNICAL FIELD

The invention relates to image display technology, in particular to a device for rendering an augmented reality image and a system for realizing augmented reality display comprising the device.

BACKGROUND

Augmented reality (AR) technology is a new display technology that seamlessly integrates real world information and virtual world information. It not only shows the real world information, but also displays the virtual information at the same time, so as to realize the mutual supplement and superposition of the two kinds of information. In visual augmented reality, helmet mounted display is used to present mixed images of the real world and computer-generated virtual images to users.

At present, most of the mainstream near eye augmented reality display devices use optical waveguide principle. For example, in a typical augmented reality display device, images on a micro display spatial light modulator (such as LCOS) are coupled to the optical waveguide through three holographic gratings, then transmitted through three optical waveguides respectively, and finally output directly in front of the human eye through the corresponding holographic grating coupling to project to the human eye. In order to realize color projection, multilayer optical waveguides can be used.

In the promotion and application of augmented reality display devices, size, performance and price are important factors that restrict the popularity. Therefore, how to take these factors into account to provide cost-effective products is a hot topic in the industry.

SUMMARY

An object of the invention is to provide a device for rendering an augmented reality image, which has advantages of simple structure, compactness and low manufacturing cost.

A device for rendering an augmented reality image according to one aspect of the invention comprises:
an optical waveguide lens; and
a first two-dimensional grating array located on a surface of the optical waveguide lens;
a second two-dimensional grating array located on the surface of the optical waveguide lens,
wherein, positions of the first two-dimensional grating array and the second two-dimensional grating array on the surface of the optical waveguide lens are set so that larger edges of the two are opposite,
wherein, the first two-dimensional grating array is configured such that rays incident on the first two-dimensional grating array expands to the entire first two-dimensional grating array on the one hand, and propagates to the second two-dimensional grating array on the other hand,
wherein, the second two-dimensional grating array is configured such that rays propagating to the second two-dimensional grating array expands to the entire second two-dimensional grating array on the one hand, and emits from the optical waveguide lens on the other hand,
wherein, the first two-dimensional grating array and the second two-dimensional grating array have the same period.

Optionally, in the above device, the first two-dimensional grating array is configured to make rays emitted from the first two-dimensional grating array propagate to the second two-dimensional grating array in a total reflection manner within the optical waveguide lens.

Optionally, in the above device, an angle between orientations of two gratings of the first two-dimensional grating array is set to be large enough to avoid forming a high-brightness region in the middle of the second two-dimensional grating array.

Optionally, in the above device, the angle is between 90° and 160°.

Optionally, in the above device, gratings of the second two-dimensional grating array are modulated with variable depth.

Optionally, in the above device, a structural morphology of the first two-dimensional grating array and the second two-dimensional grating array is one of the groups consisting of: cylindrical, conical, square and trapezoidal.

Optionally, in the above device, the first two-dimensional grating array and the second two-dimensional grating array are substantially rectangular.

Optionally, in the above device, a middle section of an edge of the first two-dimensional grating array facing the second two-dimensional grating array is farther away from the second two-dimensional grating array compared with two ends.

Optionally, in the above device, an edge of the first two-dimensional grating array facing the second two-dimensional grating array surrounds at least a part of the second two-dimensional grating array.

Optionally, in the above device, the first two-dimensional grating array and the second two-dimensional grating array are directly formed on the surface of the optical waveguide lens.

Optionally, in the above device, the first two-dimensional grating array and the second two-dimensional grating array are formed on the surface of the optical waveguide lens by means of an intermediate layer.

Optionally, in the above device, the first two-dimensional grating array and the second two-dimensional grating array are located on the same surface of the optical waveguide lens.

Optionally, in the above device, the first two-dimensional grating array and the second two-dimensional grating array are located on two opposite surfaces of the optical waveguide lens.

Optionally, in the above device, the first two-dimensional grating array includes one-dimensional grating arrays located on two opposite surfaces of the optical waveguide lens, and the second two-dimensional grating array is located on one of the two opposite surfaces.

Optionally, in the above device, there is a spacing between the first two-dimensional grating array and the second two-dimensional grating array.

Optionally, in the above device, the first two-dimensional grating array and the second two-dimensional grating array are close together.

Optionally, in the above device, end face of the optical waveguide lens is coated with a light absorption layer.

Optionally, in the above device, grating periods of the first two-dimensional grating array and the second two-dimensional grating array are 200 nm-600 nm.

Optionally, in the above device, grating depths of the first two-dimensional grating array and the second two-dimensional grating array are 50 nm-600 nm.

Another object of the invention is to provide a system for realizing augmented reality display, which has an enlarged exit pupil window, thereby improving the utilization of the lens surface.

A system for realizing augmented reality display according to another aspect of the invention comprises:
- an image source configured to provide rays containing image information; and
- a device for rendering an augmented reality image as described above.

In one or more embodiments of the invention, the first two-dimensional grating array serving as an in-coupling region and the second two-dimensional grating array serving as an out-coupling region are disposed on the surface of the optical waveguide lens, wherein the first two-dimensional grating array has both expansion and guidance functions. Since a guide region dedicated to directing rays to the out-coupling region is omitted, the overall structure of the device can be simpler and more compact, and the manufacturing cost can be reduced. In addition, omitting the dedicated guide region also helps to expand the area of the out-coupling region, thereby increasing the area of the exit pupil window and providing better visual effects. In addition, by setting the angle between orientations of the two gratings of the first two-dimensional grating array to be large enough, high-intensity ray components in a specific direction can be prevented from entering the middle of the second two-dimensional grating array, and the problem of uneven optical efficiency of the field of view image can be suppressed or eliminated.

DETAILED DESCRIPTION

The invention is described more fully below with reference to the accompanying drawings, in which illustrative embodiments of the invention are illustrated. However, the invention may be implemented in different forms and should not be construed as limited to the embodiments presented herein. The presented embodiments are intended to make the disclosure herein comprehensive and complete, so as to more comprehensively convey the protection scope of the invention to those skilled in the art.

In this specification, terms such as "comprising" and "including" mean that in addition to units and steps that are directly and clearly stated in the specification and claims, the technical solution of the invention does not exclude the presence of other units and steps that are not directly and clearly stated in the specification and claims.

Terms such as "first" and "second" do not indicate the order of the units in terms of time, space, size, etc., but are merely used to distinguish the units.

In the prior art, it is necessary to expand incident rays in the horizontal and vertical directions to expand the field of view image, and a special turning region is used to direct the expanded rays to the out-coupling region. This requires complex structural designs and high-precision manufacturing processes.

In one or more embodiments of the invention, a first two-dimensional grating array serving as an in-coupling and guiding region and a second two-dimensional grating array serving as an out-coupling region are disposed on a surface of an optical waveguide lens. When rays are incident on the first two-dimensional grating array, under the action of the first two-dimensional grating array, the rays expand to the entire first two-dimensional grating array on the one hand, and propagate to the second two-dimensional grating array on the other hand. That is, the first two-dimensional grating array has both the function of expanding the rays and the function of directing the rays to the designated region. Since a guide region or optical functional structure dedicated to directing the rays to the out-coupling region is omitted, the overall structure of the device can be simpler and more compact, which helps to meet application requirements of miniaturization, and also reduces the accuracy requirements. In addition, omitting the dedicated guide region is also beneficial to expand the area of the out-coupling region, thereby increasing the area of the exit pupil window.

In one or more embodiments of the invention, positions of the first two-dimensional grating array and the second two-dimensional grating array on the surface of the optical waveguide lens can be set flexibly, as long as enough rays are propagated from the first two-dimensional grating array to the second two-dimensional grating array. Optionally, larger edges of the first two-dimensional grating array and the second two-dimensional grating array may be opposed to allow as many rays as possible to propagate from the first two-dimensional grating array to the second two-dimensional grating array.

In one or more embodiments of the invention, the rays emitted from the first two-dimensional grating array can propagate to the second two-dimensional grating array in a total reflection manner within the optical waveguide lens by selecting appropriate structural parameters for the first two-dimensional grating array.

The two-dimensional grating array can be formed by two superimposed exposures of single beam groups. Exemplarily, firstly, positions of the exposure light source and the waveguide are fixed and a first exposure is performed to form a one-dimensional grating structure; then, with the position of the exposure light source unchanged, the waveguide is rotated by a predetermined angle along the center, and then a second exposure is completed to form a two-dimensional grating array structure. The rotation angle of the two exposures corresponds to the angle between orientations of two gratings of the formed two-dimensional grating array structure. Optionally, the angle between orientations of two gratings is between 90° and 160°.

Optionally, in the above-mentioned process of two superimposed exposures of single beam groups, the exposure light source provides two plane waves to form an exposure interference surface. It should be pointed out that other processes can also be used to form the two-dimensional grating array. For example, four plane waves can be simultaneously provided by the exposure light source, and they are divided into two groups, each group corresponds to an exposure interference surface, so that a two-dimensional grating array can be obtained by one-time exposure. A structural morphology of the formed two-dimensional grating array can be in various shapes, such as but not limited to cylindrical, conical, square and trapezoidal, and are distributed in a dot-like periodicity in two directions, that is, orientations of two gratings of the two-dimensional grating array that are consistent with the exposure directions of the two-exposure interference surface. For ease of understanding, the orientations of two gratings of the two-dimensional grating array are set as a first orientation G1 and a second orientation G2 respectively.

In one or more embodiments of the invention, by setting the angle between orientations of two gratings of the first two-dimensional grating array to be large enough (for example, the angle is set between 90° and 160°), it is possible to avoid the high-intensity ray component in a specific direction (such as the ray component emitted along a grating vector) from forming a high-brightness region in the middle of the second two-dimensional grating array after entering the second two-dimensional grating array.

It should be noted that, in one or more embodiments of the invention, shapes of the first two-dimensional grating array and the second two-dimensional grating array are not limited. Optionally, the first two-dimensional grating array and the second two-dimensional grating array are substantially rectangular; or optionally, an edge of the first two-dimensional grating array facing the second two-dimensional grating array may be curved or bent (for example, a middle section of the edge is farther away from the second two-dimensional grating array compared with two ends); or optionally, an edge of the first two-dimensional grating array facing the second two-dimensional grating array surrounds at least a part of the second two-dimensional grating array.

It should also be noted that, in one or more embodiments of the invention, there is no limitation on the spacing between the first two-dimensional grating array and the second two-dimensional grating array. Optionally, there may be the spacing between the first two-dimensional grating array and the second two-dimensional grating array, and in this case, a smooth waveguide region exists between the two, which can maximize the efficiency of the out-coupling region viewed by the human eye and avoid unnecessary diffraction attenuation. Optionally, the first two-dimensional grating array and the second two-dimensional grating array may also be integrated or close together.

Embodiments of the present invention are described below with the aid of the accompanying drawings.

Figure 1A:
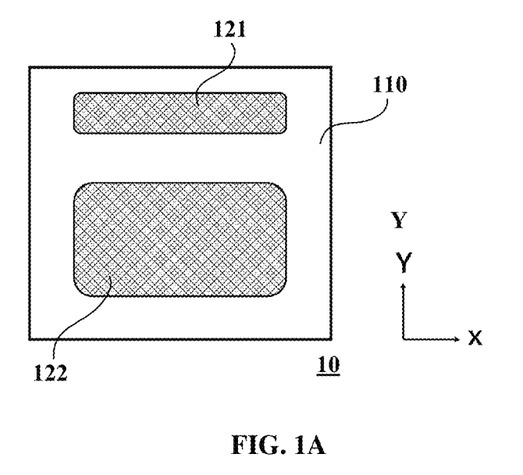
FIGS. 1A and 1B are a top view and a perspective view of a device for rendering an augmented reality image according to an embodiment of the invention, respectively.
Figure 1B:
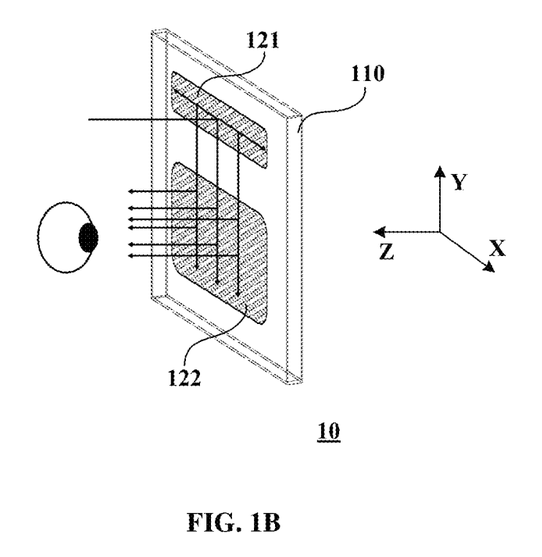

FIGS. 1A and 1B are a top view and a perspective view of a device for rendering an augmented reality image according to an embodiment of the invention, respectively. Exemplarily, the device for rendering an augmented reality image of this embodiment may take the form of glasses.

Referring to FIGS. 1A and 1B, the device 10 for rendering an augmented reality image in this embodiment includes an optical waveguide lens 110 and a first two-dimensional grating array 121 and a second two-dimensional grating array 122 disposed on a surface of the optical waveguide lens.

Optionally, the first two-dimensional grating array 121 and the second two-dimensional grating array 122 may be directly formed on the surface of the optical waveguide lens 110. Optionally, the first two-dimensional grating array 121 and the second two-dimensional grating array 122 may also be formed on the surface of the optical waveguide lens 110 by means of an intermediate layer.

Optionally, the optical waveguide lens 110 is an optical waveguide with high transmittance in a visible light band, the refractive index range is greater than 1.4, and the thickness is not greater than 2 mm.

As shown in FIGS. 1A and 1B, the first two-dimensional grating array 121 and the second two-dimensional grating array 122 are substantially rectangular, and their positions on the optical waveguide lens 110 are set so that their respective longer edges are opposite to each other.

In this embodiment, the first two-dimensional grating array 121 and the second two-dimensional grating array 122 have the same period. A two-dimensional grating array has periodicity in two directions, so the same period described here refers to the same period in two directions. Optionally, an appropriate period is selected (for example, selected in the range of 200 nm-600 nm) for the first two-dimensional grating array 121 and the second two-dimensional grating array 122 according to the diffraction efficiencies of rays with different wavelengths.

As described above, the angle between orientations of two gratings of the first two-dimensional grating array can be set sufficiently large to avoid the high-intensity ray component in a specific direction from forming a high-brightness region in the middle of the second two-dimensional grating array. In this embodiment, optionally, the angle can be selected within the range of 90°-160°.

In this embodiment, optionally, according to an influence of grating depth and duty ratio on the diffraction efficiency, an appropriate grating depth (for example, between 50 nm and 600 nm) and duty ratio are selected for the first two-dimensional grating array 121 and the second two-dimensional grating array 122. In addition, in order to equalize the brightness of the second two-dimensional grating array, the grating depth of the second two-dimensional grating array may be modulated with varying depths.

In this embodiment, optionally, a structural morphology of the first two-dimensional grating array 121 and the second two-dimensional grating array 122 may be various shapes, such as but not limited to cylindrical, conical, square and trapezoidal.

In this embodiment, optionally, the first two-dimensional grating array 121 and the second two-dimensional grating array 122 may be located on the same surface of the optical waveguide lens 110. However, it is also feasible that they are located on two opposite surfaces of the optical waveguide lens 110, respectively.

The operating principle of the device for rendering an augmented reality image shown in FIGS. 1A and 1B is described below.

Figure 2:
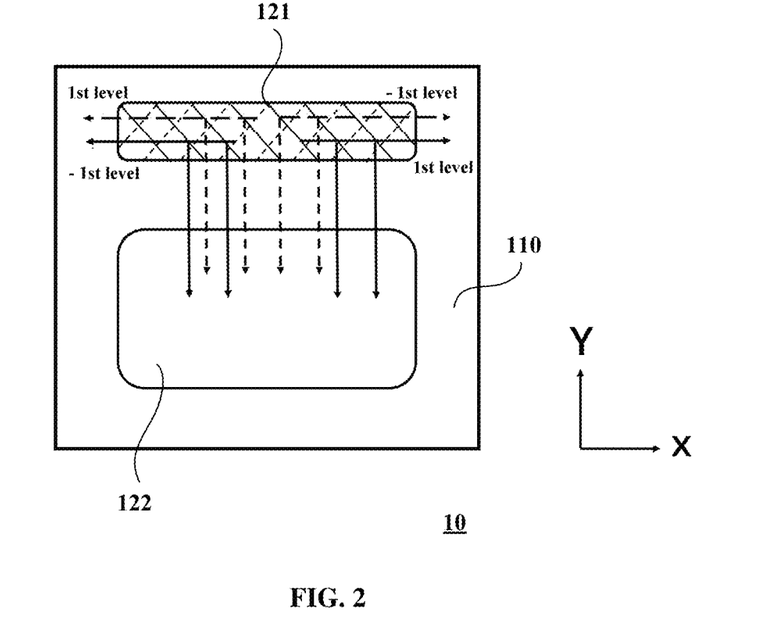
FIG. 2 is a schematic diagram of the propagation path of rays after entering the device 10 for rendering an augmented reality image.

FIG. 2 is a schematic diagram of the propagation path of rays after entering the device 10 for rendering an augmented reality image. In this embodiment, the rays from the image source are incident on the first two-dimensional grating array 121 along a direction at a certain angle with a paper surface (for example, a direction perpendicular to the paper surface), and are diffracted by the first two-dimensional grating array 121 to form a plurality of 1st-level and −1st-level diffracted rays, as shown in FIG. 2. These rays coupled through the first two-dimensional grating array can be reflected between the upper and lower surfaces of the optical waveguide lens 110, thereby expanding the rays in the horizontal direction (the X-axis direction in the figure). Further description will be made below with the help of FIGS. 3 and 4.

On the other hand, since the first two-dimensional grating array 121 is located on the surface of the optical waveguide lens 110, the diffracted rays will reach the first two-dimensional grating array 121 for many times when propagating within the optical waveguide lens, and some of the diffracted rays will form reflective diffraction and change the azimuth at the same time, so as to propagate to the second two-dimensional grating array 122 (the direction of the paper facing down in the figure), as shown in FIG. 2.

After the rays propagated in a direction close to the second two-dimensional grating array 122 reach the second two-dimensional grating array 122, they are reflected between the upper and lower surfaces of the optical waveguide lens 110, thereby expanding the rays in the horizontal direction (further description will be made below with the help of FIGS. 3 and 4).

On the other hand, since the second two-dimensional grating array 122 is located on the surface of the optical waveguide lens 110, the diffracted rays will reach the second two-dimensional grating array 122 for many times when propagating within the optical waveguide lens, and some of the diffracted rays will form transmissive diffraction and change the azimuth at the same time, so as to emit or couple out of the optical waveguide lens 110 in a direction at a certain angle with the paper surface (such as the direction perpendicular to the paper surface in the figure), Thus, the human eye can view a clear image in the entire area of the second two-dimensional grating array 122.

Figure 3:
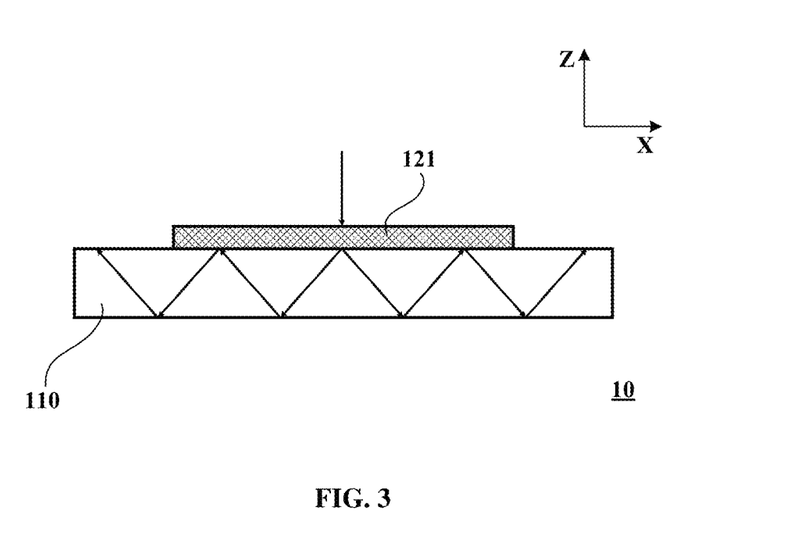
FIG. 3 is a schematic cross-sectional view of the device for rendering an augmented reality image shown in FIGS. 1A and 1B, the cross-section being located in the X-Z plane of FIG. 1B.

FIG. 3 is a schematic cross-sectional view of the device for rendering an augmented reality image shown in FIGS. 1A and 1B. FIG. 4 is a schematic cross-sectional view of the device for rendering an augmented reality image shown in FIGS. 1A and 1B, the cross-section being located in the Y-Z plane of FIG. 1B.

Referring to FIG. 3, the rays from the image source reach the first two-dimensional grating array 121. After being diffracted by the first two-dimensional grating array 121, the rays are coupled into the optical waveguide lens 110 to expand along the X-axis direction in FIG. 3. By tilting the first two-dimensional grating array 121 at an appropriate angle, the diffraction efficiency of rays coupling-in can be improved. As shown in FIG. 4, when the diffracted rays propagate within the optical waveguide lens, under the action of the first two-dimensional grating array 121, a part of the diffracted rays change the azimuth, so that they reaches the second two-dimensional grating array 122 through multiple reflections within the optical waveguide lens 110 along the Y-axis direction in FIG. 4.

Figure 4:
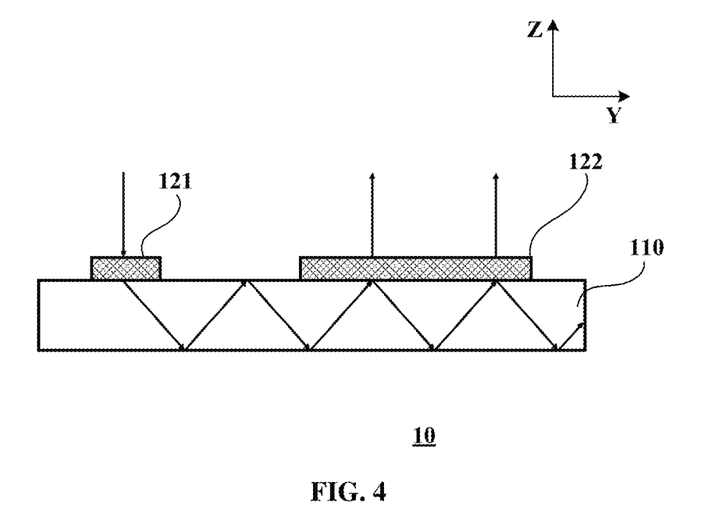
FIG. 4 is a schematic cross-sectional view of the device for rendering an augmented reality image shown in FIGS. 1A and 1B, the cross-section being located in the Y-Z plane of FIG. 1B.

Referring to FIG. 4, under the action of the second two-dimensional grating array 122, a part of the diffracted rays forms transmissive diffraction and changes the azimuth at the same time, so as to emit or couple out of the optical waveguide lens 110 along the Z-axis direction in FIG. 4, thereby rendering an augmented reality image to the user.

Figure 5:
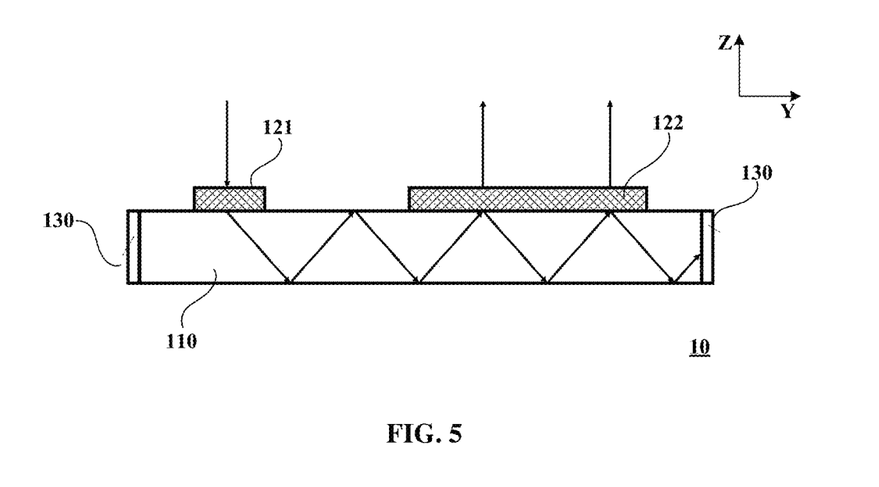
FIG. 5 is a schematic cross-sectional view of a modified form of the device for rendering an augmented reality image shown in FIGS. 1A and 1B.

In this embodiment, as shown in FIG. 5, a light absorption layer 130 may be coated on the end face or the periphery of the optical waveguide lens 110. The light absorption layer can absorb the rays reaching the end face of the optical waveguide lens, so as to avoid the interference of the end face reflection on the rays propagating within the optical waveguide lens.

Figure 6:
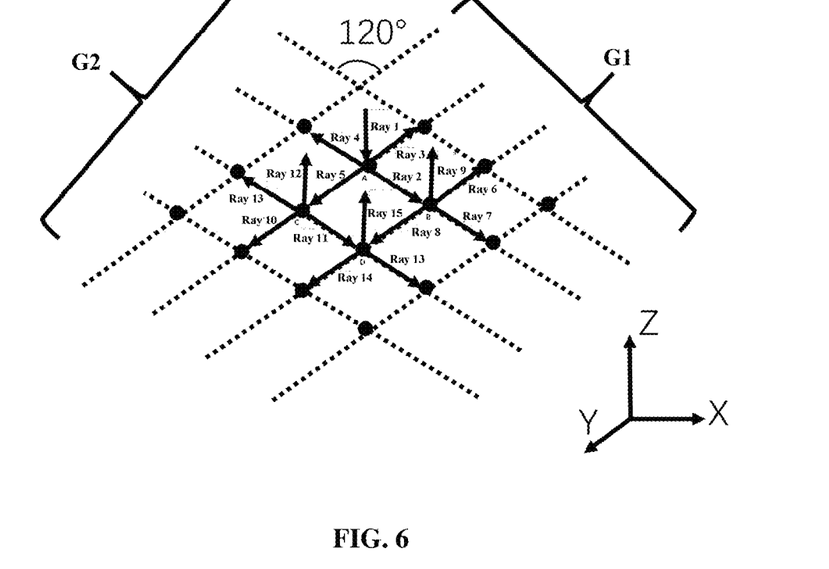
FIG. 6 is a schematic diagram of the diffraction effect of a two-dimensional grating array on rays.
Figure 7:
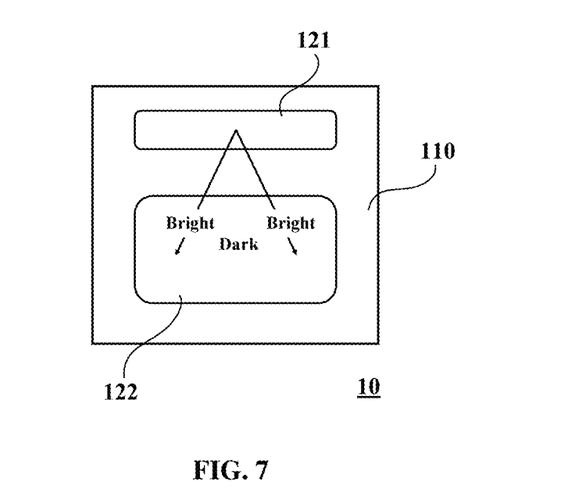
FIG. 7 schematically shows a situation in which a bright light beam is generated within the field of view.

FIG. 6 is a schematic diagram of the diffraction effect of a two-dimensional grating array on rays, and the angle between orientations of two gratings of the two-dimensional grating array shown in FIG. 7 is 120°.

In the following description, it is assumed that the two-dimensional grating array shown in FIG. 6 is the first two-dimensional grating array 121 and the second two-dimensional grating array 122 is located below the first two-dimensional grating array 121 (the Y-axis arrow in FIG. 7 shows the downward direction). As shown in FIG. 6, when ray 1 is incident on an array point A of the two-dimensional grating array, under the diffraction action of the grating, diffracted rays in four directions will be generated, which are ray 3 and ray 5 along the direction of the first orientation G1 of the grating array and ray 2 and ray 4 along the direction of the second orientation G2 of the grating array. In the situation shown in FIG. 6, the ray 3 and ray 4 propagate in a direction away from the second two-dimensional grating array or the out-coupling region, and the ray 5 propagates in a direction close to the out-coupling region along the first orientation G1 of the grating array. At the same time, the ray 2 propagates to an array point B along the direction of the second orientation G2 of the grating array. Under the action of the array structure, ray 6, ray 7, ray 8, and ray 9 will be generated. The ray 7 propagating in the direction of the second orientation G2 of the grating array to the direction of the out-coupling region occupies most of the energy of the ray 2, the ray 6 propagates in the direction of the first orientation G1 of the grating array away from the out-coupling region, the ray 9 is emitted from the two-dimensional grating array by transmissive diffraction along the Z-axis, and the ray 8 propagates in the direction of the first orientation G1 of the grating array until to an array point D. For other rays in FIG. 6, similar changes occur under the action of two-dimensional diffraction grating array.

In the situation shown in FIG. 6, compared with reflective diffraction, the ray components propagating along the two grating orientations of the first two-dimensional grating array 121 and the second two-dimensional grating array 122 have a larger intensity, resulting in two bright cylindrical regions in the first two-dimensional grating array 121 and the second two-dimensional grating array 122. When the angle between the orientations of the two gratings is small, the cylindrical regions will be located in the middle of the second two-dimensional grating array 122, resulting in the obvious uneven brightness observed in the observation region. Referring to FIG. 7, it schematically shows a situation in which a bright light beam is generated within the observation region.

Figure 8A:
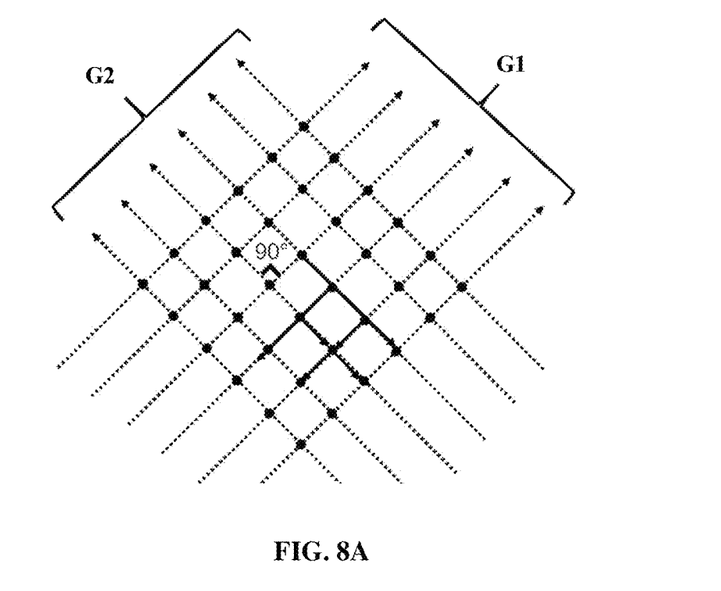
FIGS. 8A, 8B and 8C are schematic diagrams of two-dimensional grating arrays with different orientation angles.
Figure 8B:
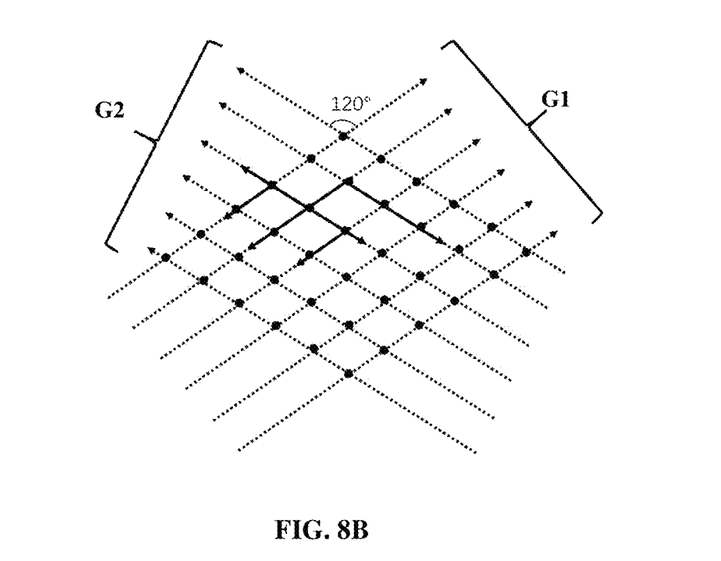
Figure 8C:
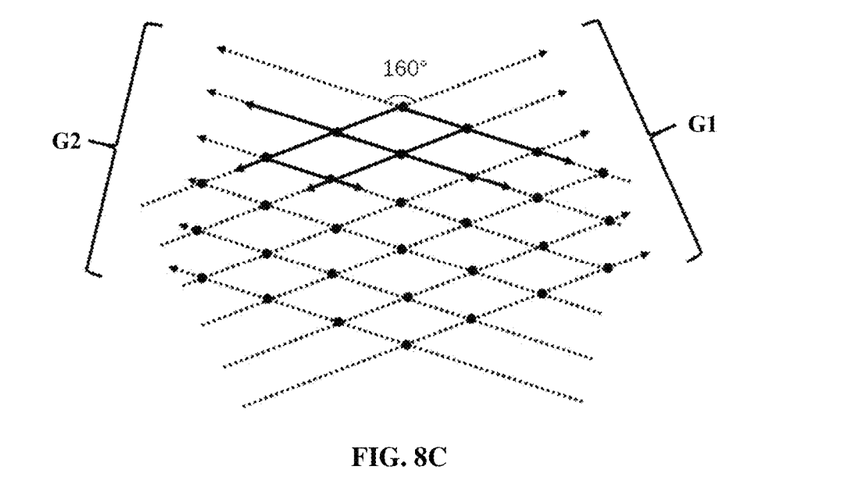

FIGS. 8A, 8B and 8C are schematic diagrams of two-dimensional grating arrays with different orientation angles, wherein the angle between orientations of the two gratings of the two-dimensional grating array shown in FIG. 8A is 90°, the angle between orientations of the two gratings of the two-dimensional grating array shown in FIG. 8B is 120°, and the angle between orientations of the two gratings of the two-dimensional grating array shown in FIG. 8C is 160°. In the two-dimensional grating array shown in FIGS. 8A-8C, the incident rays undergo multiple total reflections and diffractions to achieve image expansion and ray transmission. Moreover, the large orientation angle not only meets the viewing of the observation region, but also avoids the uneven brightness of the field of view shown in FIG. 7.

In this embodiment, the first two-dimensional grating array and the second two-dimensional grating array are substantially rectangular. Optionally, the first two-dimensional grating array shown in FIGS. 1A and 1B may be designed in a bow-tie as shown in FIG. 9.

Figure 9:
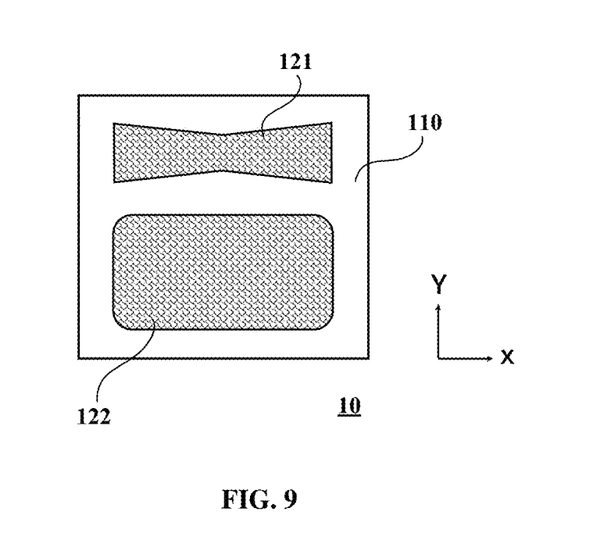
FIG. 9 is a schematic diagram of a first two-dimensional grating array using a bow-tie design.

Referring to FIG. 9, the second two-dimensional grating array 122 is substantially rectangular, and the longer edges of the first two-dimensional grating array 121 are curved or bent. In particular, the middle section of the edge of the first two-dimensional grating array 121 facing the second two-dimensional grating array 122 is farther away from the second two-dimensional grating array 122 compared with the two ends.

Figure 10:
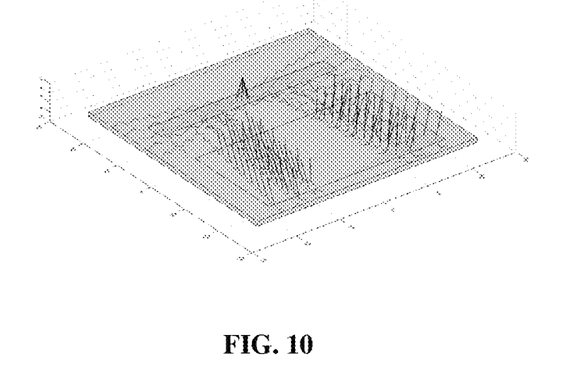
FIG. 10 is a schematic perspective view of ray transmission when the two-dimensional grating array shown in FIG. 1A is used.
Figure 11:
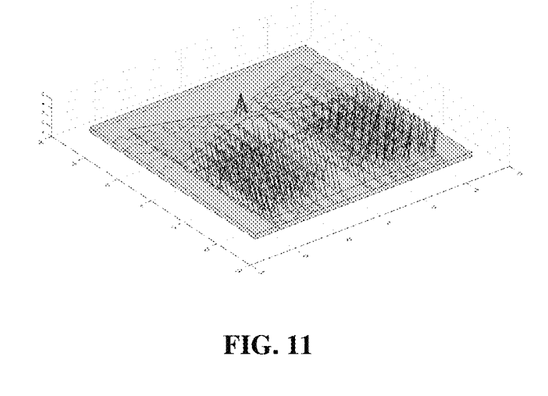
FIG. 11 is a schematic perspective view of ray transmission when the two-dimensional grating array shown in FIG. 9 is used.

FIG. 10 is a schematic perspective view of ray transmission when the two-dimensional grating array shown in FIG. 1A is used. FIG. 11 is a schematic perspective view of ray transmission when the two-dimensional grating array shown in FIG. 9 is used. It can be seen by comparison that as the transmission angle continues to increase, since the first two-dimensional grating array shown in FIG. 10 adopts a bow-tie design, the off-center rays can still be transmitted in the first two-dimensional grating array, that is, the off-center rays can still be deflected into the second two-dimensional grating array under the action of the first two-dimensional grating array, thus preventing or suppressing the escape loss of rays.

Figure 12:
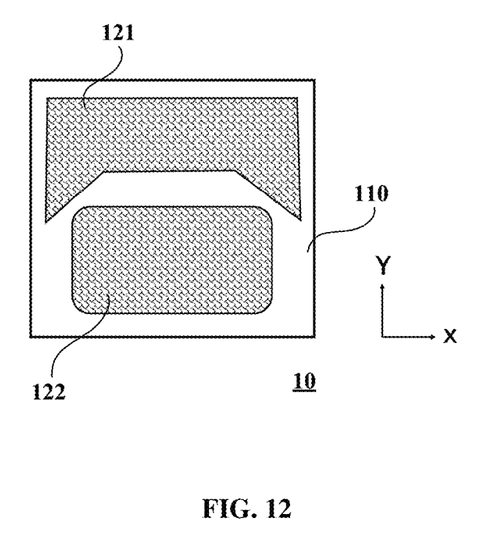
FIG. 12 is a schematic diagram of a first two-dimensional grating array using a butterfly-like design.

In this embodiment, optionally, the first two-dimensional grating array shown in FIGS. 1A and 1B may also be replaced by the first two-dimensional grating array shown in FIG. 12.

Referring to FIG. 12, the second two-dimensional grating array 122 is substantially rectangular, and the edge of the first two-dimensional grating array 121 facing the second two-dimensional grating array 122 surrounds at least a part of the second two-dimensional grating array. In the second two-dimensional grating array shown in FIG. 12, similar to the bow-tie design shown in FIG. 9, the off-center rays can still be deflected into the second two-dimensional grating array under the action of the first two-dimensional grating array, thus preventing or suppressing the escape loss of rays.

Figure 13A:
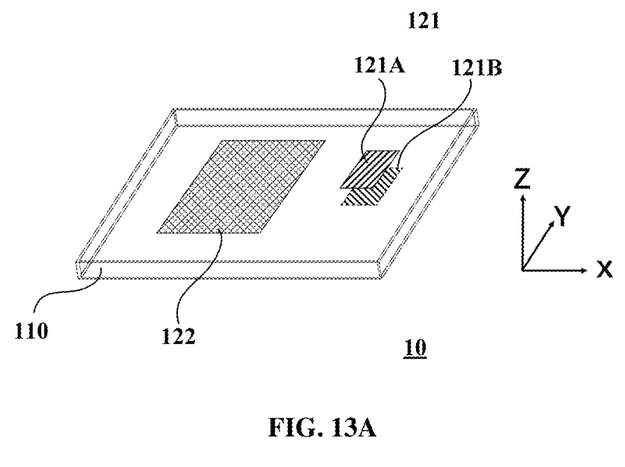
FIGS. 13A and 13B are a top view and a perspective view of a device for rendering an augmented reality image according to another embodiment of the invention, respectively.
Figure 13B:
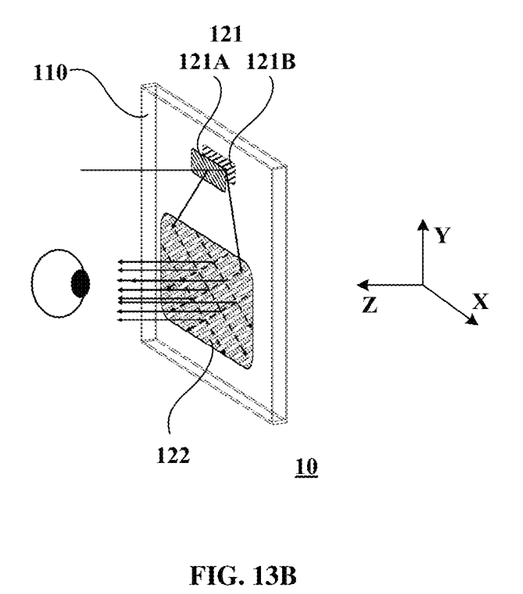

FIGS. 13A and 13B are a top view and a perspective view of a device for rendering an augmented reality image according to another embodiment of the invention, respectively. Exemplarily, the device for rendering an augmented reality image of this embodiment may take the form of glasses.

Referring to FIGS. 13A and 13B, the device 10 for rendering an augmented reality image in this embodiment includes an optical waveguide lens 110 and a first two-dimensional grating array 121 and a second two-dimensional grating array 122 disposed on a surface of the optical waveguide lens. Different from the embodiments shown in FIGS. 1A and 1B, in this embodiment, two one-dimensional grating arrays 121A and 121B included in the first two-dimensional grating array 121 are respectively located at two opposite surfaces of the optical waveguide lens 110 (the upper and lower surfaces of the optical waveguide lens in the figure), wherein the one-dimensional grating arrays 121A, 121B have different orientations. As shown in FIGS. 13A and 13B, the second two-dimensional grating array 122 is located on one of the two opposite surfaces (eg, the upper surface of the optical waveguide lens in the figures).

In addition to the differences described above, this embodiment may employ various features of the embodiment shown in FIGS. 1A and 1B. To avoid repetition, the following mainly describes aspects related to the differences.

Referring to FIG. 13B, the rays from the image source are incident on the one-dimensional grating array 121A located on the upper surface of the optical waveguide lens 110, and diffracted by the one-dimensional grating array to form diffracted rays. These in-coupled diffracted rays can be reflected between the upper and lower surfaces of the optical waveguide lens 110, thereby expanding the rays in a horizontal direction (the X-axis direction in the figure). When the diffracted rays propagate within the optical waveguide lens, they will reach the one-dimensional grating array 121A many times, and some of the diffracted rays will form reflective diffraction and change the azimuth at the same time, so as to propagate to the second two-dimensional grating array 122.

On the other hand, a part of the rays from the image source reaches the one-dimensional grating array 121B on the lower surface without being diffracted by the one-dimensional grating array 121A, and is diffracted by the one-dimensional grating array 121B to form diffracted rays. These diffracted rays can also be reflected between the upper and lower surfaces of the optical waveguide lens 110, thereby expanding the rays in the horizontal direction (the X-axis direction in the figure), and propagating to the second two-dimensional grating array 122 by changing the azimuth.

By selecting appropriate structural parameters for the one-dimensional grating arrays 121A and 121B, the diffraction angles of these diffracted rays can satisfy the total reflection condition of the optical waveguide lens, so that they propagate within the optical waveguide lens in a total reflection manner.

Figure 14:
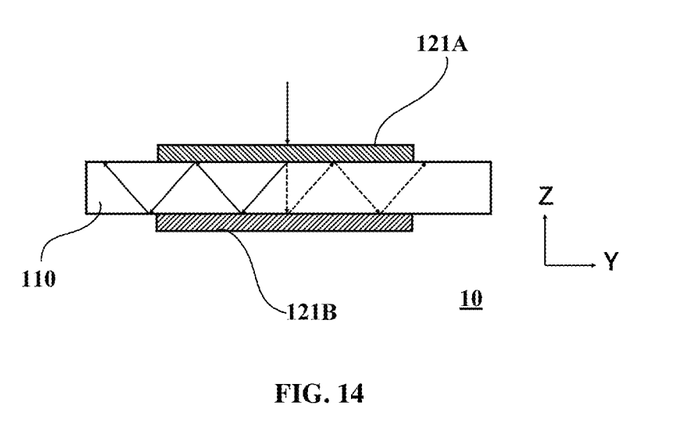
FIG. 14 is a schematic cross-sectional view of the device for rendering an augmented reality image shown in FIGS. 13A and 13B, the cross-section being located in the X-Z plane of FIG. 13B.
Figure 15:
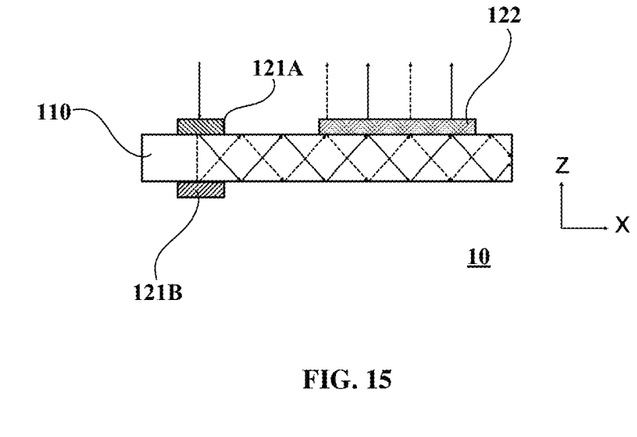
FIG. 15 is a schematic cross-sectional view of the device for rendering an augmented reality image shown in FIGS. 13A and 13B, the cross-section being located in the Y-Z plane of FIG. 13B.

FIG. 14 is a schematic cross-sectional view of the device for rendering an augmented reality image shown in FIGS. 13A and 13B, the cross-section being located in the X-Z plane of FIG. 13B. FIG. 15 is a schematic cross-sectional view of the device for rendering an augmented reality image shown in FIGS. 13A and 13B, the cross-section being located in the Y-Z plane of FIG. 13B.

Referring to FIG. 14, the rays from the image source reach the one-dimensional grating array 121A. Diffracted rays (indicated by solid lines in the figure) are formed by the diffraction action of the one-dimensional grating array 121A. The diffracted rays are reflected multiple times between the upper and lower surfaces of the optical waveguide lens 110, so that the rays are expanded along the X-axis direction in FIG. 14. On the other hand, a part of the rays from the image source reaches the one-dimensional grating array 121B without being diffracted by the one-dimensional grating array 121A, and this part of the rays is also diffracted by the one-dimensional grating array 121B to form diffracted rays (indicated by dotted lines in the figure), the diffracted rays are also reflected multiple times between the upper and lower surfaces of the optical waveguide lens 110, so that the rays are expanded along the X-axis direction in FIG. 14.

As shown in FIG. 15, when the diffracted rays formed by the one-dimensional grating arrays 121A and 121B propagate within the optical waveguide lens 110, a part of the diffracted rays changes the azimuth by the action of one-dimensional grating arrays 121A and 121B. The ray component that changes the azimuth is reflected multiple times within the optical waveguide lens 110 and reaches the second two-dimensional grating array 122.

Since the two-way transmission of rays is realized within the waveguide lens 110, not only the scope of the observation region can be enlarged, but also the display efficiency can be improved.

Continuing to refer to FIG. 15, under the action of the second two-dimensional grating array 122, some diffracted rays form transmissive diffraction and change the azimuth at the same time, so as to exit or couple out of the optical waveguide lens 110 along the Z-axis direction in FIG. 15, thereby rendering the augmented reality image to the user.

The foregoing describes the principles and preferred embodiments of the invention. However, the invention should not be construed as limited to the specific embodiments discussed. The above-described preferred embodiments should be considered illustrative rather than restrictive, and it should be understood that those skilled in the art can make changes in these embodiments without departing from the scope of the invention defined in the following claims.

What is claimed is:

1. A device for rendering an augmented reality image, which is characterized by comprising:
    an optical waveguide lens; and
    a first two-dimensional grating array located on a surface of the optical waveguide lens;
    a second two-dimensional grating array located on the surface of the optical waveguide lens,
    wherein, positions of the first two-dimensional grating array and the second two-dimensional grating array on the surface of the optical waveguide lens are set so that the first two-dimensional grating array and second two-dimensional grating array are not overlapped in a direction perpendicular to the surface of the optical waveguide lens and larger edges of the first and second two-dimensional grating arrays are opposite to each other,
    wherein, the first two-dimensional grating array is configured such that rays incident on the first two-dimensional grating array expands to the entire first two-dimensional grating array on the one hand, and propagates to the second two-dimensional grating array on the other hand,
    wherein, the second two-dimensional grating array is configured such that rays propagating to the second two-dimensional grating array expands to the entire second two-dimensional grating array on the one hand, and emits from the optical waveguide lens on the other hand,
    wherein, the first two-dimensional grating array and the second two-dimensional grating array have the same period,
    wherein a middle section of an edge of the first two-dimensional grating array facing the second two-dimensional grating array is farther away from the second two-dimensional grating array compared with two ends,
    wherein the edge of the first two-dimensional grating array facing the second two-dimensional grating array surrounds at least a part of the second two-dimensional grating array.

2. The device according to claim 1, wherein the first two-dimensional grating array is configured to make rays emitted from the first two-dimensional grating array propagate to the second two-dimensional grating array in a total reflection manner within the optical waveguide lens.

3. The device according to claim 1, wherein an angle between orientations of two gratings of the first two-dimensional grating array is set to be large enough to avoid forming a high-brightness region in the middle of the second two-dimensional grating array.

4. The device according to claim 3, wherein the angle is between 90° and 160°.

5. The device according to claim 1, wherein a structural morphology of the first two-dimensional grating array and the second two-dimensional grating array is one of the groups consisting of: cylindrical, conical, square and trapezoidal.

6. The device according to claim 1, wherein the first two-dimensional grating array and the second two-dimensional grating array are directly formed on the surface of the optical waveguide lens.

7. The device according to claim 1, wherein the first two-dimensional grating array and the second two-dimensional grating array are formed on the surface of the optical waveguide lens by means of an intermediate layer.

8. The device according to claim 1, wherein the first two-dimensional grating array and the second two-dimensional grating array are located on the same surface of the optical waveguide lens.

9. The device according to claim 1, wherein the first two-dimensional grating array and the second two-dimensional grating array are located on two opposite surfaces of the optical waveguide lens.

10. The device according to claim 1, wherein the first two-dimensional grating array includes one-dimensional grating arrays located on two opposite surfaces of the optical waveguide lens respectively, and the second two-dimensional grating array is located on one of the two opposite surfaces.

11. The device according to claim 1, wherein there is a spacing between the first two-dimensional grating array and the second two-dimensional grating array.

12. The device according to claim 1, wherein the first two-dimensional grating array and the second two-dimensional grating array are close together.

13. The device according to claim 1, wherein end face of the optical waveguide lens is coated with a light absorption layer.

14. The device according to claim 1, wherein grating periods of the first two-dimensional grating array and the second two-dimensional grating array are 200 nm-600 nm.

15. The device according to claim 1, wherein grating depths of the first two-dimensional grating array and the second two-dimensional grating array are 50 nm-600 nm.

16. A system for realizing augmented reality display, which is characterized by comprising:
- an image source configured to provide rays containing image information; and
- a device for rendering an augmented reality image according to claim 1.

* * * * *